United States Patent [19]

Morimoto et al.

[11] Patent Number: 4,507,985

[45] Date of Patent: Apr. 2, 1985

[54] APPARATUS FOR CONTROLLING A DIRECT DRIVE CLUTCH FOR A VEHICLE AUTOMATIC TRANSMISSION

[75] Inventors: Yoshiro Morimoto, Yokohama; Norimasa Kishi, Yokosuka, both of Japan

[73] Assignee: Nissan Motor Company, Limited, Yokohama, Japan

[21] Appl. No.: 173,884

[22] Filed: Jul. 31, 1980

[30] Foreign Application Priority Data

Aug. 4, 1979 [JP] Japan ................... 54-99123

[51] Int. Cl.³ .................. B60K 41/06; F16H 47/00
[52] U.S. Cl. ........................... 74/866; 74/862; 74/865; 74/731; 192/3.31
[58] Field of Search ................. 74/861, 865, 866, 867, 74/868, 869, 731, 732; 192/3.31

[56] References Cited

U.S. PATENT DOCUMENTS

| 3,693,478 | 9/1972 | Malloy | 74/731 |
|---|---|---|---|
| 4,027,554 | 6/1977 | Ito et al. | 74/866 |
| 4,160,392 | 7/1979 | Sunohara et al. | 74/732 |
| 4,208,929 | 6/1980 | Heino et al. | 74/731 |
| 4,262,335 | 4/1981 | Ahlen et al. | 74/866 |
| 4,263,822 | 4/1981 | Harmon | 74/861 X |
| 4,270,636 | 6/1981 | Sunohara et al. | 74/731 |

FOREIGN PATENT DOCUMENTS 50-40957  4/1975  Japan .

Primary Examiner—Allan D. Herrmann
Assistant Examiner—Joseph M. Rolnicki
Attorney, Agent, or Firm—Lane, Aitken & Kananen

[57] ABSTRACT

An automatic transmission includes a torque converter with a direct drive clutch and at least one planetary gear unit, and is controlled electronically. The engagement of the direct drive clutch is controlled, independently of a first relation between the vehicle speed and the engine torque to perform shifting, on the basis of a second relation between the vehicle speed and the engine torque. The direct drive clutch can be engaged in each forward running shift postion, and is disengaged at the time of shifting for a predetermined time. Line pressure from a main regulator valve is modulated when the direct drive clutch is engaged.

5 Claims, 6 Drawing Figures

APPARATUS FOR CONTROLLING A DIRECT DRIVE CLUTCH FOR A VEHICLE AUTOMATIC TRANSMISSION

BACKGROUND OF THE INVENTION

The present invention relates generally to a vehicle automatic transmission including a torque converter with a direct drive clutch, and more particularly to a controlling apparatus of the direct drive clutch.

Such an automatic transmission conventionally includes, besides the torque converter, and the direct drive clutch which is adapted to directly connect an input and an output member of the torque converter, at least one planetary gear unit connected with the output member of the torque converter, a plurality of frictional elements by which the power transmission path in the planetary gear unit is changed to obtain a plurality of shift positions, and hydraulic circuit means for selectively supplying oil pressure to the frictional elements based on a predetermined relation between the vehicle speed and the engine torque and for supplying the oil pressure to the direct drive clutch also.

In such an automatic transmission, the direct drive clutch is engaged only in the third speed shift position and when the vehicle speed is more than a predetermined value so as to eliminate slip in the torque converter and to improve the fuel consumption characteristic.

Conventionally, however, the direct drive clutch is controlled by hydraulic circuit means only, so that the control of the direct drive clutch depends on the shift position control. Thus, a direct drive condition can be obtained only in the third speed, so that a sufficient improvement of the fuel consumption characteristic cannot be achieved. Further, since the direct drive clutch is engaged at the time of shifting, when the vehicle is driven at a high speed, the automatic transmission produces a substantial shift shock.

SUMMARY OF THE INVENTION

A primary object of the present invention is to eliminate or at least mitigate the above mentioned disadvantages, and to provide an electronically controlled direct drive clutch controlling apparatus for an automatic transmission including a direct drive clutch operation discriminating circuit which produces a signal to actuate the direct drive clutch control valve based on a predetermined relation between the vehicle speed and the engine torque, independently of the shift position control of the transmission, to enable engagement of the direct drive clutch at all the shift positions, so as to improve the fuel consumption characteristic.

Another object of the present invention is to provide a controlling apparatus of the type mentioned above, including means to maintain the disengaged condition of the direct drive clutch for a predetermined time during the shifting operation, in order to reduce the shift shock.

Still another object of the present invention is to provide a controlling apparatus of the type mentioned above, including means to modulate line pressure, i.e. regulated oil pressure from a pressure regulator valve, when the automatic shifting is effected in the engaged condition of the direct drive clutch, to further reduce the shift shock by producing slip in the frictional elements, e.g. the clutch.

A further object of the present invention is to provide a controlling apparatus of the type mentioned above, including means to inhibit the modulation of the line pressure in order to prevent the slip of the clutch when the direct drive clutch is disengaged, since otherwise the torque multiplying effect of the torque converter tends to cause the direct drive clutch to slip.

Other features and advantages of the present invention will become apparent with reference to the following detailed description of one preferred embodiment, by way of example, shown in the attached drawings.

DETAILED DESCRIPTION OF A PREFERRED EMBODIMENT

Figure 1:
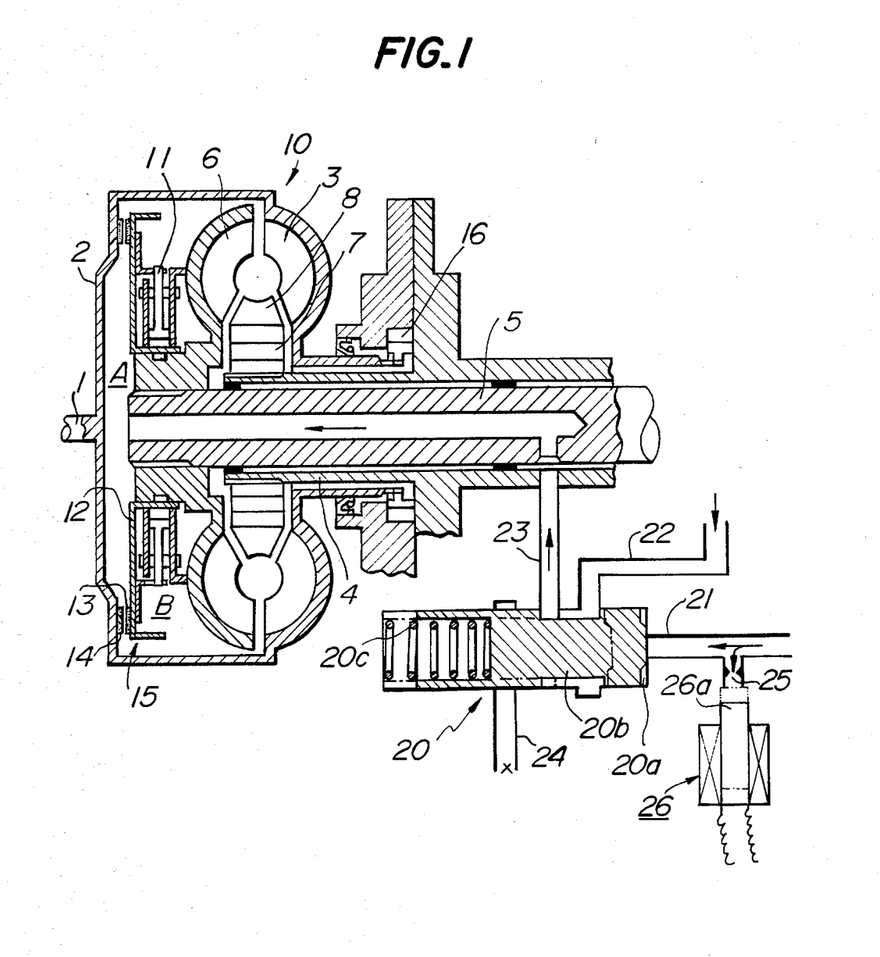
FIG. 1 is a schematic sectional view of a torque converter with a direct drive clutch and a controlling apparatus therefor, to which the present invention may be applied.
Figure 2:
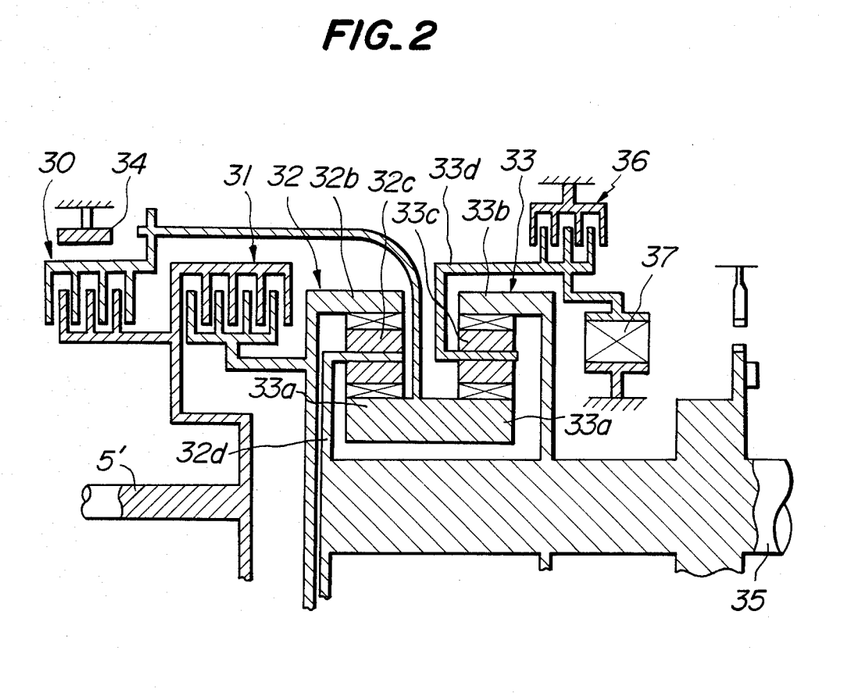
FIG. 2 is a schematic sectional view of a transmission mechanism which may be combined with the torque converter of FIG. 1.

An automatic transmission to which the present invention may be applied includes a torque converter with a direct drive clutch shown in FIG. 1, and a transmission mechanism shown in FIG. 2.

Referring now to FIG. 1, the torque converter with the direct drive clutch includes a drive plate 2 and a pump impeller 3 which rotate integrally with a drive shaft 1 secured to a crank shaft of an engine, not shown. A turbine runner 6 is connected by a spline connection with one end of an output shaft 5 which is rotatably supported in a hollow stationary shaft 4. A stator 8 is connected through a one-way clutch 7 with the hollow stationary shaft 4. The pump impeller 3, turbine runner 6 and stator 8 jointly form the torque converter 10. The turbine runner 6 has a boss which axially slidably supports a direct drive clutch piston 12 through a torsional damper 11. Opposite surfaces of the direct drive clutch piston 12 and the drive plate 2 carry clutch facings 13 and 14 which are frictionally engageable to each other, and which form the direct drive clutch 15. An oil pump 16 driven by the drive shaft 1 supplies hydraulic oil to the torque converter 10.

A lock-up valve 20 which controls the direct drive clutch 15 includes a hydraulic chamber 20a, a valve body 20b which is axially slidable in the hydraulic chamber 20a and controls hydraulic oil supply to the direct drive clutch 15, a spring 20c which urges the valve body 20b to an inoperative position shown in FIG. 1. An oil conduit 21 supplies hydraulic oil to the hydraulic chamber 20a. The lock-up valve 20 is connected with a conduit 22 which introduces torque converter pressure, a conduit 23 which communicates the valve 20 with a chamber A between the drive plate 2 and the drive piston 12, and a drain conduit 24, as shown in FIG. 1.

As will be described hereinafter, the conduit 21 is supplied through a second orifice, not shown in FIG. 1, with rear clutch pressure which drives a rear clutch. The conduit 21 has a third orifice 25 which is opened or closed by a plunger 26a of a lock-up solenoid 26.

When the lock-up solenoid 26 is deenergized, the plunger 26a is retracted as shown by the solid line in FIG. 1, so that the orifice 25 is opened and the rear clutch pressure in the conduit 21 is drained. Thus, the valve body 20b of the lock-up valve 20 is urged rightward by the force of the spring 20c, as shown in FIG. 1.

In this instance, the torque converter pressure in the conduit 22 is transmitted, through the lock-up valve 20, the conduit 23 and a conduit extending through the output shaft, to the chamber A. As the torque converter pressure also is applied to a chamber B which is on right side of the direct drive clutch piston 12, pressures in the chambers A and B across the clutch piston 12 are balanced so that the clutch facings 13 and 14 are separated from each other to disengage the direct drive clutch 15.

Thus, the torque converter 10 is effective, and power from the drive shaft 1 is transmitted through the drive plate 2, pump impeller 3 and turbine runner 6 to the output shaft 5.

When the lock-up solenoid 26 is energized, the plunger 26a is projected to close the orifice 25, so that the rear clutch pressure in the conduit 21 is applied into the hydraulic chamber 20a of the lock-up valve 20. The valve body 20b is moved leftwards against the force of the spring 20c to the left end position. Thus, the conduit 23 is disconnected from the conduit 22 and communicates with the conduit 24.

As the conduit 23 is drained through the conduit 24, pressure in the chamber A is decreased. Torque converter pressure in the chamber B urges the direct drive clutch piston 12 leftwards in FIG. 1, so that the clutch facings 13 and 14 are engaged with each other to lock-up the direct drive clutch 15.

By this, power from the drive shaft is transmitted mechanically through the drive plate 2, direct drive clutch 15, direct drive clutch piston 12, torsional damper 11 and turbine runner 6 to the output shaft 5.

The transmission mechanism of the automatic transmission is shown in FIG. 2, and includes an input shaft 5' which is integral with the output shaft 5 of the torque converter 10 shown in FIG. 1. The input shaft 5' is connectable through a front clutch 30 with a sun gear 32a of a front planetary gear unit 32 and a sun gear 33a of a rear planetary gear unit 33. The input shaft 5' is connectable through a rear clutch 31 with an internal gear 32b of the front planetary gear unit 32.

The sun gear 32a and 33a which are secured with each other can be fixed through a band brake 34. An output shaft 35 is secured with a planet carrier 32d which rotatably supports pinions 32c of the front planetary gear unit 32, with an internal gear 33b of the rear planetary gear unit 33. Power through the transmisssion mechanism is transmitted by the output shaft 35.

Pinions 33c of the rear planetary gear unit 33 are supported by a planet carrier 33d. The planet carrier 33d can be fixed through a low-and-reverse brake 36, and is rotatable through a one-way clutch 37, in one direction only, i.e. in the direction in which the engine input shaft 1 rotates.

By a hydraulic control system and an electronic control system to be described hereinafter, the front clutch 30, rear clutch 31, band brake 34 and low-and-reverse brake 36 are selectively engaged to select one of a parking range P, a reverse range R, a neutral range N, a front drive range D, a second speed range 2 and a first speed range 1. In the D range, automatic shifting between first, second and third speeds can be effected. The illustrated transmission mechanism, per se, is conventional, so that the detailed description of the mechanism is omitted.

Figure 3:
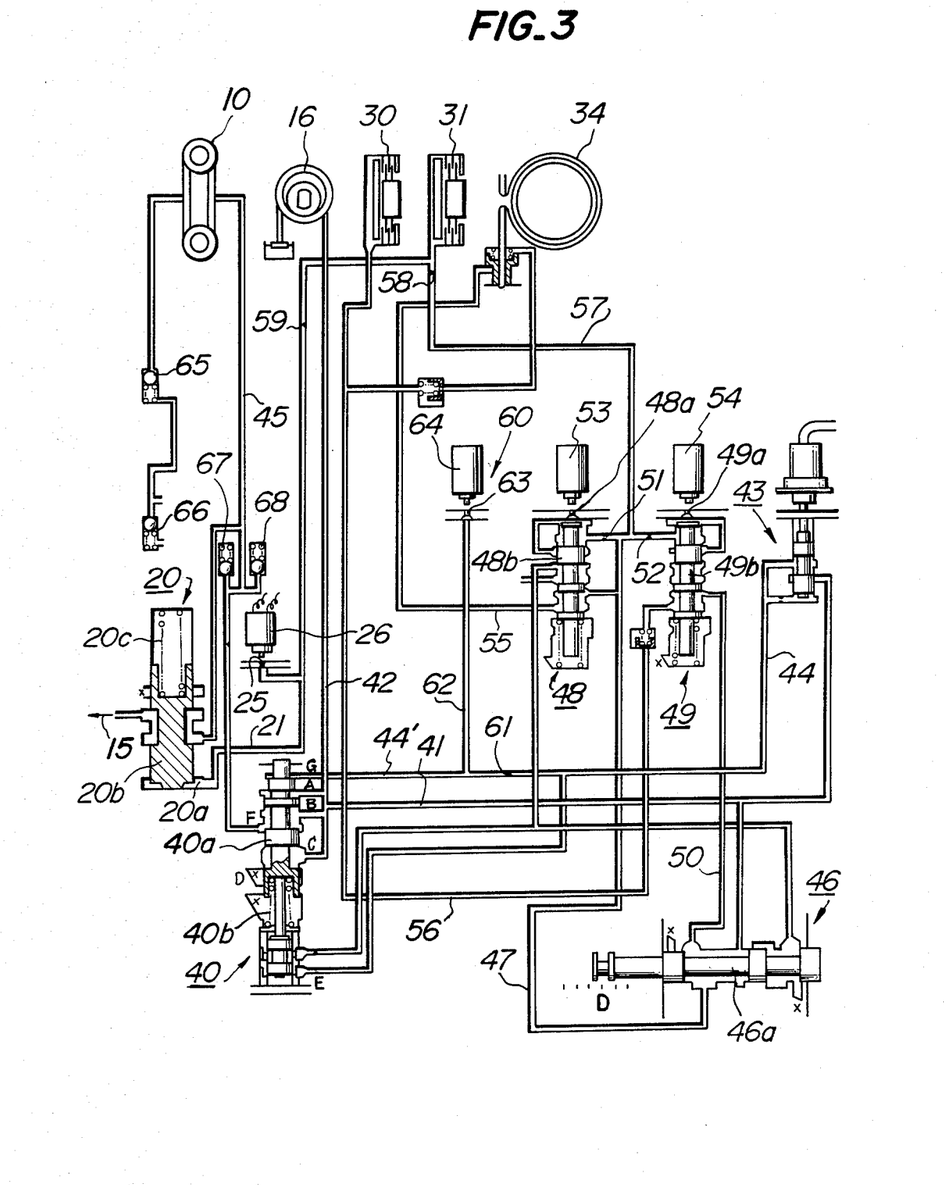
FIG. 3 is a hydraulic circuit diagram showing one example of a hydraulic control system for the transmission mechanism shown in FIG. 2.

FIG. 3 shows the hydraulic control system which controls the torque converter with the direct drive clutch shown in FIG. 1 and the transmission mechanism shown in FIG. 2. In FIG. 3, the same reference numerals correspond to those shown in FIGS. 1 and 2. Some portions of the hydraulic control system which are not essential are omitted to clearly describe the present invention.

Referring to FIG. 3, a pressure regulator valve 40 regulates pressure of pressurized oil which is supplied by a hydraulic pressure source, i.e. the oil pump 16 shown in FIG. 1, and supplies through a conduit 41 oil under regulated pressure which is called line pressure. The line pressure is regulated to perform a desired control in an optimum manner at a normal driving condition of a vehicle. Pressurized oil from the oil pump 16 is supplied through a conduit 42 and an orifice of a port A to an annular surface of a valve spool 40a of the pressure regulator valve 40. Thus, the valve spool 40a is urged downwards against a spring 40b, and is balanced when a portion of the oil through a port C is released from a drain port D. When an acceleration pedal (not shown) is depressed, a vacuum throttle valve 43, which produces throttle pressure inversely proportional to intake manifold negative pressure, supplies a higher throttle pressure through a passage 44 and an orifice of a port E to the valve spool 40a. As the throttle pressure and the spring 40b urge the valve spool 40a upwards against the line pressure, to decrease the opening of the drain port D, the line pressure through the conduit 41 is increased when the throttle pressure is increased.

The regulated line pressure is selectively supplied through a manual valve 46 and shift valves 48 and 49, which will be described hereinafter, to the front clutch 30, rear clutch 31 and band brake 34.

Hydraulic oil from a port B of the pressure regulator valve 40 is supplied, as the torque converter pressure, through a port F and a hydraulic oil circuit 45, to the torque converter 10 and the lock-up valve 20.

The manual valve 46 is manually operated to effect a change between the P, R, N, D, 2 and 1 ranges. Only the D range is explained hereinafter, since the other ranges do not relate to the present invention. In the D range, a valve spool 46a of the manual valve 46 is at the position shown in FIG. 3, and supplies the line pressure from the conduit 41 to a 1-2 shift valve 48, a 2-3 shift valve 49 and the rear clutch 31 through conduits 47 and 57. The 2-3 shift valve 49 is also supplied with the line pressure through a conduit 50.

The 1-2 shift valve 48 automatically shifts between the first and second speeds, and the 2-3 shift valve 49 automatically shifts between the second and third speeds. The line pressure through the conduit 47 is supplied to the shift valves 48 and 49 through orifices 51 and 52 as pilot pressure, and is drained through nozzles 48a and 49a, respectively. The nozzles 48a and 49a are opened or closed by 1-2 shift solenoid 53 and 2-3 shift solenoid 54, respectively.

The 1-2 shift solenoid 53 and 2-3 shift solenoid 54 are deenergized as shown in FIG. 3, and the nozzles 48a and 49a are opened to decrease the pilot pressure. Thus, valve spools 48b and 49b are in the upper position as shown in FIG. 3. The 1-2 shift valve 48 supplies the line pressure through the conduit 47 to an engage-side chamber of the band brake 34 through a conduit 55, and the 2-3 shift valve 49 supplies the line pressure to a release-side chamber of the band brake 34 and to the front clutch 30 through a conduit 56. The both side chambers of the band brake 34 are supplied with the line pressure. In this condition, the transmission mechanism is driven at the third speed.

When the 2-3 shift solenoid 54 is energized, the nozzle 49a is closed to increase the pilot pressure acting on the valve spool 49b of the 2-3 shift valve 49. The valve spool 49b is moved downwards, and the conduit 56 is disconnected from the conduit 50 and not supplied with the line pressure. As the conduit 56 is drained, the release-side chamber of the band brake 34 and the front clutch 30 are also drained to engage the band brake 34 and release the front clutch 30. In this condition, the transmission mechanism is driven at the second speed.

When the 1-2 shift solenoid 53 is also energized, the nozzle 48a is closed to increase the pilot pressure acting on the valve spool 48b of the 1-2 shift valve 48. The valve spool 48b is moved downwards, and the conduit 55 is disconnected from the conduit 47 and not supplied with the line pressure. Consequently, the engage-side chamber of the band brake 34 is drained to release the band brake 34. The one-way clutch 37 shown in FIG. 2 is effective and the transmission mechanism is driven at the first speed.

When the manual valve 46 is at the D range, i.e. in the normal forward driving condition of the vehicle, operating conditions at the first, second, and third speeds of the above mentioned elements, i.e. ON and OFF states of the 1-2 shift solenoid 53 and the 2-3 solenoid 54, as well as the application of the line pressure to the front clutch 30, rear clutch 31 and engage-side and release-side chambers of the band brake 34 are shown in Table 1, in which "0" shows application of the line pressure.

TABLE 1

| | 1-2 shift solenoid 53 | 2-3 shift solenoid 54 | front clutch 30 | rear clutch 31 | band brake 34 engage side | band brake 34 release side |
|---|---|---|---|---|---|---|
| 1st speed | ON | ON | | 0 | | |
| 2nd speed | OFF | ON | | 0 | 0 | |
| 3rd speed | OFF | OFF | 0 | 0 | 0 | 0 |

The conduit 57 which supplies the line pressure through the conduits 47 and 41 to the rear clutch 31 includes a first orifice 58, and the downstream side of the orifice 58 is connected with the conduit 21 which supplies hydraulic oil to the lock-up valve 20 through a second orifice 59. As described before, the conduit 21 has a third orifice 25 and a lock-up solenoid 26 which controls to open or close the orifice 25.

A line pressure modulating device 60 modulates the line pressure by applying a hydraulic pressure to the pressure regulator valve 40. More particularly, a branch conduit 44' of the conduit 44 which passes the throttle pressure is connected with a port G of the pressure regulator valve 40. The conduit 44' includes an orifice 61 and a branch conduit 62 which is connected downstream of the orifice 61. A nozzle 63 is connected with the branch conduit 62 and a cut-back solenoid 64 opens or closes the nozzle 63.

When the cut-back solenoid 64 is deenergized, the nozzle 63 drains the oil pressure in the conduit 62 and the conduit 44' downstream of the orifice 61. As the port G of the pressure regulator valve 40 is not applied with the pressure and the valve spool 40a is in the upper position, the line pressure through the conduit 41 is kept at a high level. When the cut-back solenoid 64 is energized, the nozzle 63 is closed so that the oil pressure through the conduit 44 and 44' is applied to the valve spool 40a of the pressure regulator valve 40. Thus, the valve spool 40a is urged downwards and the line pressure through the conduit 41 is decreased, by partly draining the line pressure from the drain port D.

A torque converter pressure reserve valve 65, a relief valve 66 on the downstream side of the torque converter 10, and lubricating valves 67 and 68 for the front and rear portions of the vehicle are also shown in FIG. 3.

Figure 4:
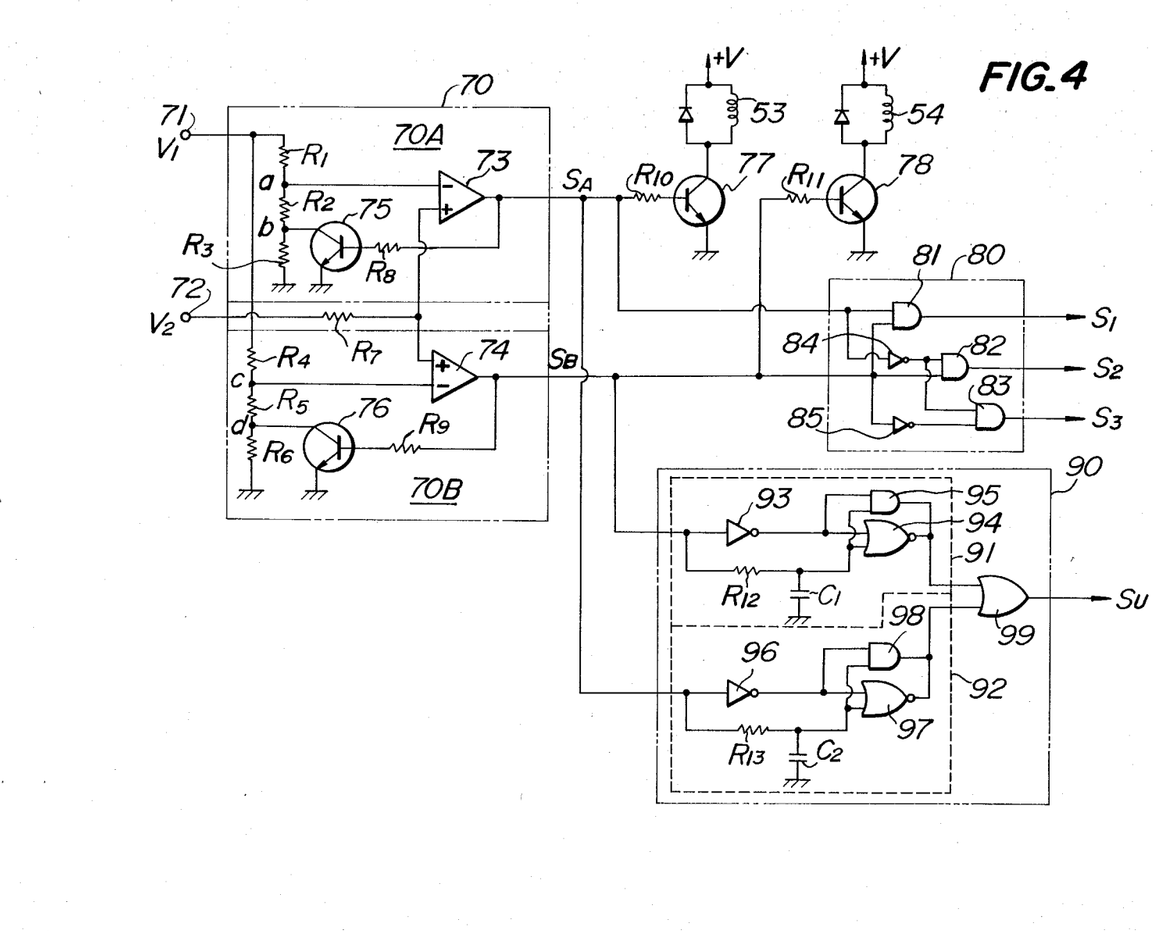
FIGS. 4 and 5 are circuit diagrams of an electronic control apparatus according to one embodiment of the present invention.
Figure 5:
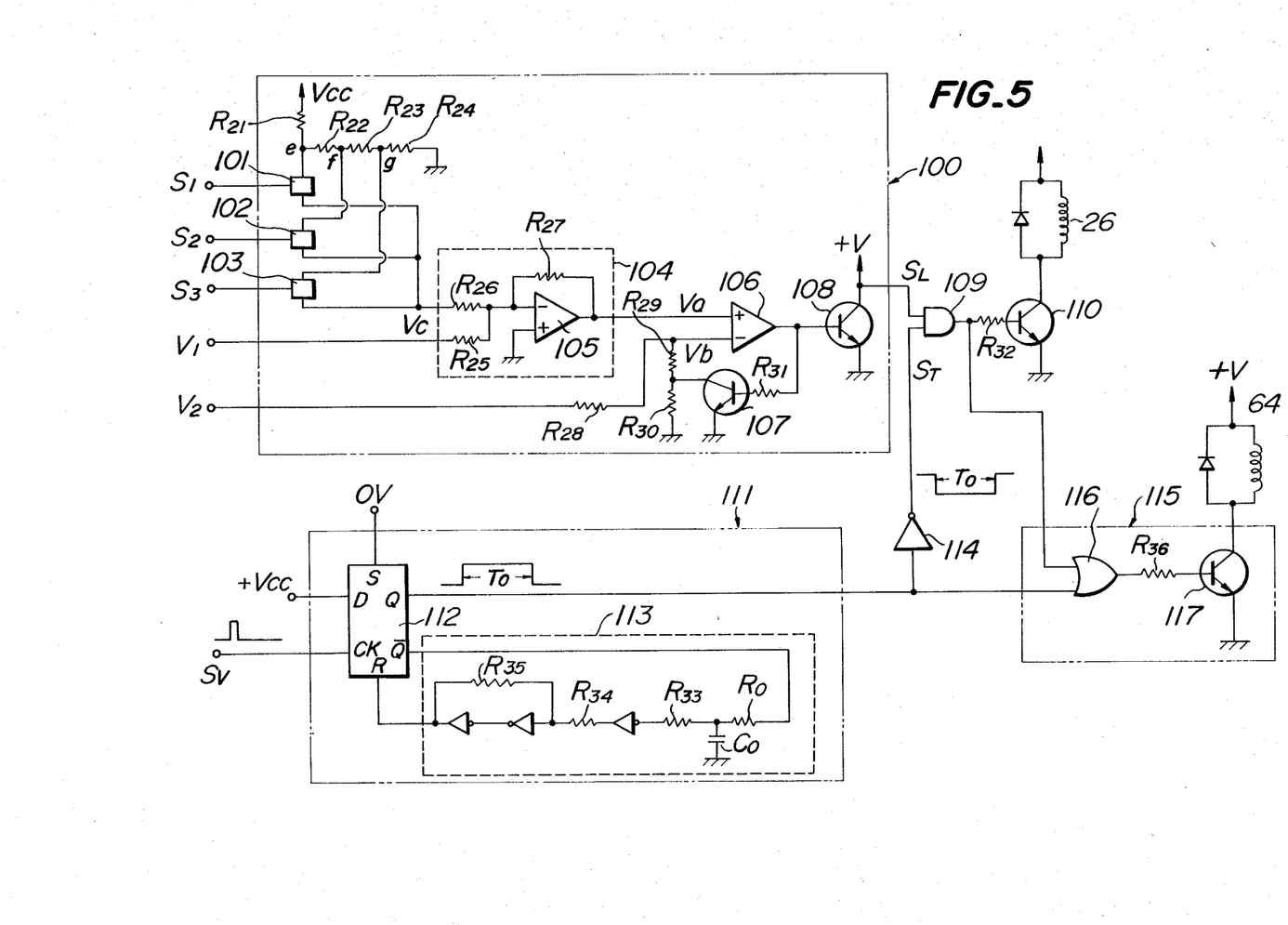
Figure 6:
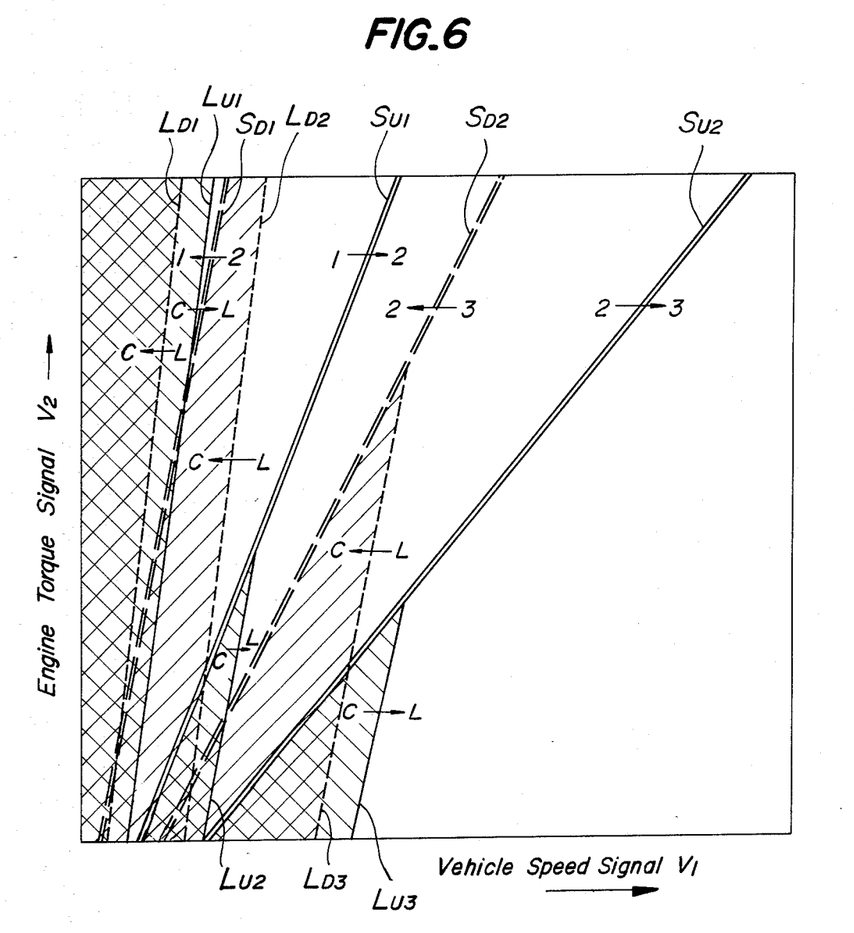
FIG. 6 is a graph showing shift lines and direct drive clutch engaging and disengaging lines according to the apparatus shown in FIGS. 4 and 5.

FIGS. 4 and 5 show the electronic control system according to the present invention, which controls the 1-2 shift solenoid 53 and the 2-3 shift solenoid 54 to perform shifting between the first, second and third speeds, controls the lock-up solenoid 26 to engage or disengage the direct drive clutch 15, and controls the cut-back solenoid 64 to modulate the line pressure. FIG. 6 shows upshift and downshift lines and engaging and disengaging lines of the direct drive clutch.

Referring firstly to FIG. 6, the lines $S_{U1}$ and $S_{U2}$ show upshift lines from the first to second speed, and from the second to third speed, respectively, while lines $S_{D2}$ and $S_{D1}$ show downshift lines from the third to second speed and from the second to first speed, respectively. Lines $L_{U1}$, $L_{U2}$ and $L_{U3}$ show direct drive clutch engaging or ON lines at the first, second and third speeds, respectively, and lines $L_{D1}$, $L_{D2}$ and $L_{D3}$ show direct drive clutch disengaging or OFF lines at the first, second and third speeds, respectively. In FIG. 6, oblique lines show torque converter operating regions in terms of the vehicle speed and engine load, with rightwardly descending oblique lines indicating the upshift regions and leftwardly descending oblique lines indicating the downshift regions.

Referring to FIG. 4, a shift discriminating circuit 70 produces control signals to control energization of the 1-2 shift solenoid 53 and the 2-3 shift solenoid 54 which operate the 1-2 shift valve 48 and the 2-3 shift valve 49, respectively, on the basis of a first relation between the vehicle speed and engine torque i.e. the relation between the shift lines $S_{U1}$, $S_{D1}$, $S_{U2}$ and $S_{D2}$ shown in FIG. 6.

A signal corresponding to the vehicle speed, i.e. a vehicle speed signal is generated by a tacho-generator, in the form of a voltage $V_1$ which is proportional to the engine revolution. The voltage $V_1$ is applied to a first input terminal 71. A signal corresponding to the engine torque, i.e. an engine torque signal is generated by a throttle opening detector, in the form of a voltage which is proportional to throttle opening, or by an intake manifold negative pressure detector for generating a voltage which is inversely proportional to the manifold negative pressure, and such a voltage $V_2$ is applied to a second input terminal 72.

The shift discriminating circuit 70 comprises a 1-2 shift circuit 70A and a 2-3 shift circuit 70B. The 1-2 shift circuit 70A and the 2-3 shift circuit 70B both receive the vehicle speed signal $V_1$ and the engine torque signal $V_2$. The vehicle speed signal $V_1$ is divided by resistors $R_1$, $R_2$ and $R_3$ of the 1-2 shift circuit 70A and by resistors $R_4$, $R_5$ and $R_6$ of the 2-3 shift circuit 70B. In the 1-2 shift circuit 70A, a divided voltage at a junction a between the resistors $R_1$ and $R_2$ is applied to a negative input terminal of a comparator 73. The engine torque signal $V_2$ is supplied through a resistor $R_7$ to a positive terminal of the comparator 73. A transistor 75 is provided, which includes a collector connected to a junction b between the resistors $R_2$ and $R_3$, an emitter connected to ground, and a base connected with an output $S_A$ of the comparator 73. When the output $S_A$ of the comparator 73 is at a high level, the transistor 75 is conductive to connect the junction b with the ground so that the voltage at the junction a is decreased.

In the 2-3 shift circuit 70B, a divided voltage at a junction c between the resistors $R_4$ and $R_5$ is applied to a negative input terminal of a comparator 74. The engine torque signal $V_2$ is supplied through a resistor $R_7$ to a positive terminal of the comparator 74. A transistor 76 is provided, which includes a collector connected to a junction d between the resistors $R_5$ and $R_6$, an emitter connected to the ground, and a base connected with an output $S_B$ of the comparator 74. When the output $S_B$ of the comparator 74 is at a high level, the transistor 76 is conductive to connect the junction d with the ground so that the voltage at the junction c is decreased. The resistance of the resistance $R_4$ is larger than that of the resistor $R_1$, while the resistance of the resistors $R_2$ and $R_5$ and the resistances of the resistors $R_3$ and $R_6$ are substantially the same, respectively. Thus, at a given vehicle speed signal $V_1$, the voltage at the junction a is higher than that of the junction c.

When the effective vehicle speed signal $V_1$ is smaller than the effective engine torque signal $V_2$ at the inputs of the comparators 73 and 74, the outputs $S_A$ and $S_B$ of the comparators are at the high level "H", and the outputs $S_A$ and $S_B$ are apppled through resistors $R_{10}$ and $R_{11}$ respectively to bases of transistors 77 and 78 respectively, so that the transistors 77 and 78 are conductive. Thus, the 1-2 shift solenoid 53 and the 2-3 shift solenoid 54 are energized so that the first speed is obtained as shown in the Table 1 mentioned above.

When the vehicle speed is increased, the vehicle speed signal $V_1$ is increased beyond the 1-2 upshift line $S_{U1}$ shown in FIG. 6, and the voltage at the junction a, i.e. the input voltage to the comparators 73 exceeds the input voltage from the engine torque signal $V_2$ so that the output $S_A$ of the comparator 73 of the 1-2 shift circuit 70A is reversed to the low level "L". Thus, the transistor 77 becomes non-conductive, so that the 1-2 shift solenoid 53 is deenergized. By this, the second speed condition shown in Table 1 is achieved.

When the output $S_A$ of the comparator 73 is at the low level "L", the transistor 75 becomes non-conductive and opens the connection across the resistor $R_3$. Thus, the voltage at the junction a is increased to maintain the second speed condition until the vehicle speed signal $V_1$ is decreased beyond the 1-2 downshift line $S_{D1}$ shown in FIG. 6. When the vehicle speed signal $V_1$ is sufficiently decreased, the output $S_A$ of the comparator 73 increases to the high level "H" so that the downshift into the first speed condition is attained.

When the vehicle speed is further increased in the second speed driving condition, the vehicle speed signal $V_1$ is increased beyond the 2-3 upshift line $S_{U2}$, and the voltage at the junction c becomes higher than the effective engine torque signal applied to the comparator 74 of the 2-3 shift circuit 70B. Thus, the output $S_B$ of the comparator 74 is reversed to the low level "L". By this, the transistor 78 turns off, and the 2-3 shift solenoid 54 is deenergized to attain the third speed condition.

When the output $S_B$ of the comparator 74 is at the low level "L", the transistor 76 is turned off, and opens the connection across the resistor $R_6$. Thus the voltage at the junction c is increased to maintain the third speed driving condition, until the vehicle speed signal $V_1$ is decreased beyond the 2-3downshift line $S_{D2}$ shown in FIG. 6. When the vehicle speed is sufficiently decreased, the output $S_B$ of the comparator 74 increases to the high level "H" so that a downshift is performed from the third speed to the second speed.

In this way, upshifting and downshifting between the first, second and third speeds are performed automatically.

A gear position discriminating circuit 80 discriminates whether the automatic transmission is in a first, second or third speed condition. The circuit 80 consists of a logic circuit which has three AND circuits 81, 82 and 83 and two inverters 84 and 85. Outputs $S_A$ and $S_B$ of the comparators 73 and 74 are applied to input terminals of the AND circuits 81, 82 and 83 directly or through one of the inverters 84 and 85. When the outputs $S_A$ and $S_B$ of the comparators 73 and 74 are both at the high level "H" corresponding to the first speed condition, output $S_1$ of the AND circuit 81 only is at high level "H". When the output $S_A$ of the comparator 73 is at the low level "L" and the output $S_B$ of the comparator 74 is at the high level "H" corresponding to the second speed condition, output $S_2$ of the AND circuit 82 only is at high level "H". When the outputs $S_A$ and $S_B$ of the comparators 73 and 74 are both at the low level "L" corresponding to the third speed condition, output $S_2$ of the AND circuit 83 only is at high level "H". Thus, the gear ratio of the automatic transmission can be discriminated by the output $S_1$, $S_2$ and $S_3$ of the AND circuits 81, 82 and 83.

A shift detecting circuit 90 detects starting of shifting between the first, second and third speeds and supplies shift signal $S_U$. The circuit 90 comprises an edge trigger circuit 91 which detects the level variation of the output $S_A$ of the comparator 73, an edge trigger circuit 92 which detects the level variation of the output $S_B$ of the comparator 74, and an OR circuit 99. The edge trigger circuit 91 consists of an inverter 93, a delay circuit formed by a resistor $R_{12}$ and a capacitor $C_1$, a NOR circuit 94 which detects increase in the output signal level, and an AND circuit 95 which detects the level decrease of the output signal $S_A$. The edge trigger circuit 92 consists of a NAND circuit 96, a delay circuit formed by a resistor $R_{13}$ and a capacitor $C_2$, a NOR circuit 97 and an AND circuit 98.

When one of the outputs $S_A$ and $S_B$ of the comparators 73 and 74 decreases from the high level "H" to the low level "L" or increases from the low level "L" to the high level "H", a pulse signal is generated as a shift signal $S_U$ at the output terminal of the OR circuit 99.

FIG. 5 shows control circuit which controls operation of the lock-up solenoid 26 and the cut-back solenoid 64.

A discriminating circuit 100, which discriminates operation of the direct drive clutch, receives the vehicle speed signal $V_1$ and the engine torque signal $V_2$, compares the vehicle speed and the engine torque on the basis of a second relation, i.e. the relation between direct drive clutch engaging and disengaging lines $L_{U1}$, $L_{D1}$, $L_{U2}$, $L_{D2}$, $L_{U3}$ and $L_{D3}$ shown in FIG. 6, and generates a control signal $S_L$ which controls energization and deenergization of the lock-up solenoid 26 which controls actuation of the lock-up valve 20 shown in FIGS. 1 and 3.

The discriminating circuit 100 includes analog switches 101, 102 and 103 which receive the first speed signal $S_1$, second speed signal $S_2$ and third speed signal $S_3$ from the gear position discriminating circuit 80 shown in FIG. 4, respectively. The analog switch 101, 102 and 103 is conductive when the signal $S_1$, $S_2$ or $S_3$ is at the high level "H" and supplies a correction voltage Vc to an adder 104. A voltage Vcc is divided by resistors $R_{21}$, $R_{22}$, $R_{23}$ and $R_{24}$ and the voltage at one of the junctions e, f and g is selctively supplied as the correction voltage Vc by the analog switch 101, 102 or 103 which is at a high level "H" at that time.

The adder 104 comprises an operational amplifier 105. The positive terminal of the amplifier 105 is connected with ground and the negative terminal thereof receives the vehicle speed signal $V_1$ through a resistor $R_{25}$ and also receives the correction voltage Vc through a resistor $R_{26}$. A feed back resistor $R_{27}$ is connected between an output terminal and the negative input terminal of the amplifier 105. Thus, the output Va of the adder 104 is lower when the vehicle speed signal $V_1$ and/or correction voltage Vc are higher.

A comparator 106 receives at its positive input terminal the output voltage Va of the adder 104 and at its negative input terminal a voltage Vb which is obtained by dividing the engine torque signal $V_2$ by resistors $R_{28}$, $R_{29}$ and $R_{30}$. When the voltage Va is higher than the voltage Vb, the output of the comparator 106 is at a high level "H", and when the voltage Va is lower than the voltage Vb, the output of the comparator 106 is at a low level "L".

A transistor 107 is provided in order to obtain a hysteresis effect in a manner like that provided by the transistors 75 and 76 shown in FIG. 4. Output of the comparator 106 is connected through a resistor $R_{31}$ with base of the transistor 107. Emitter of the transistor 107 is connected with ground, and collector thereof is connected with a junction between the resistors $R_{29}$ and $R_{30}$. When output of the comparator 106 is at a high level "H", the transistor 107 is conducted and the resistor $R_{30}$ is short circuited, while when the output of the comparator 106 is at a low level, the transistor 107 opens the short circuit across the resistor $R_{30}$. Thus, the voltage Vb increases and the output of the comparator 106 is maintained at the low level "L". A transistor 108 inverts the output of the comparator 106. Output $S_L$ of the transistor 108 is applied to an AND circuit 109 whose output is applied to a transistor 110 through a resistor $R_{32}$ to actuate the lock-up solenoid 26.

The direct drive clutch operation discriminating circuit 100 operates as follows. The vehicle speed signal $V_1$ is added with the correction voltage Vc corresponding to the shift position. The correction voltage Vc is the highest at the first speed, and the lowest at the third speed. The inverted and amplified output voltage Va of the adder 104 is compared with the voltage Vb which corresponds to the engine torque signal $V_2$. When the voltage Va is higher than the voltage Vb, i.e. when the vehicle speed signal has a lower level, the output of the comparator 106 increases to a high level "H", and the transistor 108 becomes conductive so that the output $S_L$ of the transistor 108 decreases to the low level "L". Thus, the output of the AND circuit 109 is also at the low level "L" so that the transistor 110 is not conductive. Consequently, the lock-up solenoid 26 is not energized and maintains the direct drive clutch 15 in the disengaged condition as shown in FIG. 1.

When the vehicle speed is increased, the vehicle speed signal $V_1$ increases beyond one of the direct drive clutch engaging lines $L_{U1}$, $L_{U2}$ and $L_{U3}$ shown in FIG. 6, and the output voltage Va of the adder 104 is decreased below the voltage Vb, so that the output of the comparator 106 is inverted to the low level "L", by which the transistor 108 is turned off. Thus the output $S_L$ of the transistor 108 increases to the high level "H".

In this condition, when the other input signal $S_T$, which will be described hereinafter, of the AND circuit 109 is also at the high level "H", the output of the AND circuit 109 is at the high level "H" so that the transistor 110 is turned on. Consequently, the lock-up solenoid 26 is energized to move the lock-up valve 20 shown in FIG. 1. Thus, the direct drive clutch 15 is engaged.

When the output of the comparator 106 is at the low level "L", the transistor 107 is turned off to increase the voltage Vb. Thus, even when the vehicle speed is decreased, the direct drive condition is maintained until the vehicle speed is decreased beyond one of the direct drive clutch disengaging lines $L_{D1}$, $L_{D2}$ and $L_{D3}$. When the vehicle speed is decreased sufficiently, the voltage Va becomes higher than the increased voltage Vb and the output of the comparator 106 is again increased to the high level "H", so that the lock-up solenoid 26 is deenergized to disengage the direct drive clutch 15.

In this way, when the second relation between the engine torque and the vehicle speed allows an engagement of the direct drive clutch without causing any adverse effect e.g. engine stalling, the direct drive clutch 15 is engaged in the first, second and third speed driving conditions to provide an improved fuel consumption characteristic.

A time retaining circuit 111 is a known one shot multivibrator comprising a flip flop circuit 112 and a delay circuit 113 which is connected between an inverse output terminal Q and a reset terminal R of the flip flop circuit 112. When a pulse of the shift signal Sv is applied to a clock terminal CK of the flip flop circuit 112, a high level "H" appears at an output terminal Q for a predetermined time $T_0$. When the resistance of resistor $R_{33}$ and $R_{34}$ equals 10 kΩ, and the resistance of resistor $R_{35}$ is 100 kΩ, the time $T_0 = K \cdot R_0 C_0$, in which $R_0$ is the resistance of a resistor $R_0$, $C_0$ is the capacity of capacitor $C_0$ and K is a constant ($K \cong 0.7$).

The output signal of the terminal Q of the time retaining circuit is inverted by an inverter 114, and the inverted signal $S_T$ is the other input of the AND circuit 109.

Thus, for a predetermined time $T_0$ after receiving the shift signal Sv, the output signal $S_T$ of the inverter 114 is at the low level "L", so that for the time $T_0$, the output of the AND circuit 109 is at the low level "L" even when the output signal $S_L$ of the discriminating circuit 100 is at the high level "H". Consequently, the lock-up solenoid 26 is deenergized and the direct drive clutch 15 is disengaged. By this, shifting shock can be greatly reduced.

A cut-back control circuit 115 controls the operation of the cut-back solenoid 64 which modulates the line pressure. An OR circuit 116 receives the output signal of the AND circuit 109 and the output signal of the time retaining circuit 111, and a transistor 117 receives the output of the OR circuit 116 at the base thereof through a resistor $R_{36}$.

When the output of the AND circuit 109 is at the low level "L", i.e. when the direct drive clutch 15 is disengaged, the output of the OR circuit 116 is also at the low level "L", so that the transistor 117 is turned off. Thus, the cut-back solenoid 64 is deenergized. Consequently, the nozzle 63 shown in FIG. 3 is opened so that the pressure regulator valve 40 supplies a high line pressure through the conduit 41. When the direct drive clutch 15 is disengaged, drain from the orifice 25 shown in FIG. 3 tends to decrease the hydraulic pressure in the rear clutch 31, and torque multiplying function of the torque converter tends to cause slip of the front clutch 30 and the rear clutch 31. However, by maintaining the high line pressure, such a slip can be positively eliminated.

During the shifting between the speed ratios, or for the predetermined time $T_0$ after the pulse of shift signal Sv is applied, the output of the time retaining circuit 111 is at the high level "H", so that output of the OR circuit 116 is at the high level "H", regardless of the output level of the AND circuit 109. Thus, the transistor 117 is turned on, and the cut-back solenoid 64 is energized to open the nozzle 63 shown in FIG. 3. Consequently, the pressure regulator valve 40 produces the modulated line pressure through the conduit 41.

By modulating the line pressure, the front and rear clutches 30 and 31 are allowed to slip during the shifting. Thus, shifting shock can be further reduced.

It will be appreciated that by electronically controlling the direct drive clutch according to the present invention, the direct drive clutch is engaged at any shift position when the second relation between the vehicle speed and the engine torque is satisfied so that the engine power can be transmitted mechanically to the transmission mechanism to provide improved power transmission efficiency and fuel consumption characteristic.

The direct drive clutch in the engaged condition is disengaged during the shifting for a predetermined time so that the shift shock can be reduced. Moreover, during the shifting, the main pressure regulator valve produces the modulated line pressure, so that shift shock can be further reduced.

When the torque converter is operative to drive the vehicle, i.e. in the condition in which the direct drive clutch is disengaged, the pressure regulator valve produces the high line pressure, except during the shifting operation, so that the front and rear clutches are prevented from slipping, and the power loss is decreased.

What is claimed is:
1. An automatic transmission comprising:
    a torque converter;
    a direct drive clutch adapted to directly connect input and output members of the torque converter;
    at least one planetary gear unit connected with the output member of the torque converter;
    a plurality of frictional elements which effect a changeover of a power transmission path in the planetary gear unit to provide a plurality of shift positions;
    hydraulic circuit means having a pressurized oil source, a pressure regulator valve regulating oil pressure supplied from the oil source, a plurality of shift valves selectively supplying the regulated oil pressure to the frictional elements based on a predetermined first relation between vehicle speed and engine torque, and a direct drive clutch control valve selectively supplying the regulated oil pressure to the direct drive clutch, said direct drive clutch control valve including a valve body controlling a supply of the oil pressure to the direct drive clutch, a hydraulic chamber applying the oil pressure onto the valve body and an oil conduit supplying said regulated oil pressure to the hydraulic chamber through at least one of said shift valves and at least one of said frictional elements, said conduit having a first orifice between said one of the shift valves and said one of the frictional elements, a second orifice between said one of the frictional elements and said hydraulic chamber, and a third drain orifice between said second orifice and said hydraulic chamber, and further comprising an electromagnetic valve which opens or closes said third drain orifice in response to said signal actuating said direct drive clutch control valve; and
    a direct drive clutch operation discriminating circuit which receives a signal corresponding to the vehicle speed and a signal corresponding to the engine torque and produces a signal actuating said drive drive clutch control valve based on a predetermined second relation between the vehicle speed and the engine torque.

2. An automatic transmission comprising: a torque converter; a direct drive clutch adapted to directly connect input and output members of the torque converter; at least one planetary gear unit connected with the output member of the torque converter; a plurality of frictional elements which effect a changeover of power transmission path in the planetary gear unit to provide a plurality of shift positions; hydraulic circuit means having a pressurized oil source, a pressure regulator valve regulating oil pressure supplied from the oil source, a plurality of shift valves selectively supplying the regulated oil pressure to the frictional elements based on a predetermined first relation between vehicle speed and engine torque, and a direct drive clutch control valve selectively supplying the regulated oil pressure to the direct drive clutch; a direct drive clutch discriminating circuit which receives a signal corresponding to the vehicle speed and a signal corresponding to the engine torque and produces a signal actuating said direct drive clutch control valve based on a predetermined second relation between the vehicle speed and the engine torque; a shift discriminating circuit which receives a signal corresponding to the vehicle speed and a signal corresponding to the engine torque and produces a signal actuating said shift valve based on said predetermined first relation between the vehicle speed and the engine torque; and a time retaining circuit which receives said signal actuating said shift valve from said shift discriminating circuit and produces at the time of shifting a signal for a predetermined time for actuating said direct drive clutch control valve to maintain the disengaged condition of the direct drive clutch.

3. An automatic transmission as claimed in claim 2, wherein said direct drive clutch control valve includes a valve body controlling supply of the oil pressure to the direct drive clutch, a hydraulic chamber applying the oil pressure onto the valve body and an oil conduit supplying said regulating oil pressure to the hydraulic chamber through at least one of said shift valves and at least one of said frictional elements, said conduit having a first orifice between said one of the shift valves and said one of the frictional elements, a second orifice between said one of the frictional elements and said hydraulic chamber, and a third drain orifice between said second orifice and said hydraulic chamber, and further comprising an electromagnetic valve which opens or closes said third drain orifice in response to said signal actuating said direct drive clutch control valve.

4. An automatic transmission comprising: a torque converter; a direct drive clutch adapted to directly connect input and output members of the torque converter, at least one planetary gear unit connected with the output member of the torque converter; a plurality of frictional elements which effect a changeover of power transmission path in the planetary gear unit to provide a plurality of shift positions; hydraulic circuit means having a pressurized oil source, a pressure regulator valve regulating oil pressure supplied from the oil source, a plurality of shift valves selectively supplying the regulated oil pressure to the frictional elements based on a predetermined first relation between vehicle speed and engine torque, and a direct drive clutch control valve selectively supplying the regulated oil pressure to the direct drive clutch; a direct drive clutch operation discriminating circuit which receives a signal corresponding to the vehicle speed and a signal corresponding to the engine torque and produces a signal actuating said direct drive clutch control valve based on a predetermined second relation between the vehicle speed and the engine torque; an electromagnetic valve modulating said regulated oil pressure by supplying said throttle oil pressure to said pressure regulator valve; and a cut-back control circuit which receives said signal actuating said direct drive clutch control valve from said direct drive clutch operation discriminating circuit and produces a signal to be supplied to said electromagnetic valve to inhibit modulation of the regulated oil pressure when the direct drive clutch is disengaged.

5. An automatic transmission comprising: a torque converter; a direct drive clutch adapted to directly connect input and output members of the torque converter; at least one planetary gear unit connected with the output member of the torque converter; a plurality of frictional elements which effect a changeover of power transmission path in the planetary gear unit to provide a plurality of shift positions; hydraulic circuit means having a pressurized oil source, a pressure regulator valve regulating oil pressure supplied from the oil source, a plurality of shift valves selectively supplying the regulated oil pressure to the frictional elements based on a predetermined first relation between vehicle speed and engine torque, and a direct drive clutch control valve selectively supplying the regulated oil pressure to the direct drive clutch; a direct drive clutch operation discriminating circuit which receives a signal corresponding to the vehicle speed and a signal corresponding to the engine torque and produces a signal actuating said direct drive clutch control valve based on a predetermined second relation between the vehicle speed and the engine torque; a shift discriminating circuit which receives a signal corresponding to the vehicle speed and a signal corresponding to the engine torque and produces a signal actuating said shift valve based on said predetermined first relation between the vehicle speed and the engine torque; a time retaining circuit which receives said signal actuating said shift valve from said shift discriminating circuit and produces at the time of shifting a signal for a predetermined time for actuating said direct drive clutch control valve to maintain the disengaged condition of the direct drive clutch; an electromagnetic valve modulating said regulated oil pressure by supplying said throttle oil pressure to said pressure regulator valve; and a cut-back control circuit which receives said signal actuating said direct clutch control valve from said direct drive clutch operation discriminating circuit and produces a signal to be supplied to said electromagnetic valve to inhibit modulation of the regulated oil pressure when the direct drive clutch is disengaged.

* * * * *